Nov. 8, 1927.
H. V. ATWELL
1,648,670
PROCESS OF EXTRACTING FATS
Original Filed Feb. 27, 1923
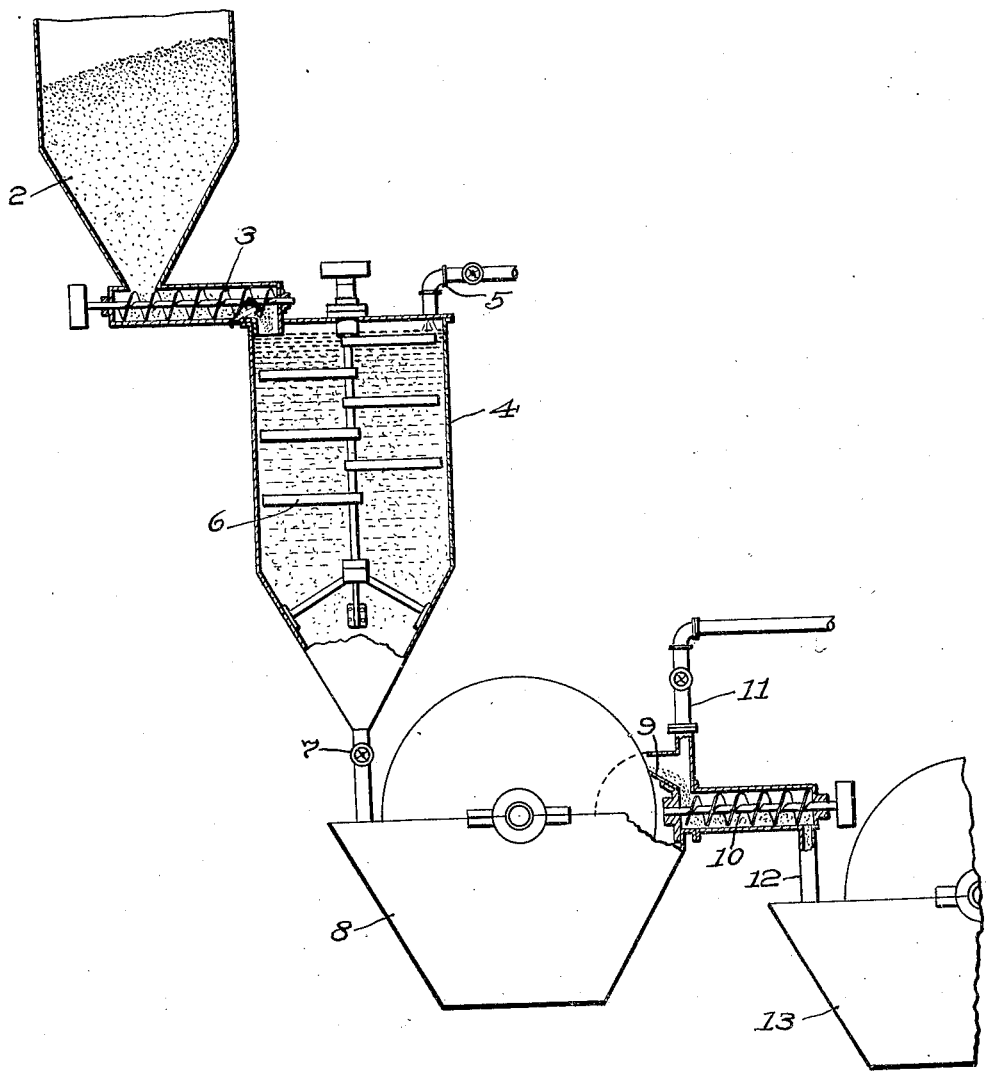
INVENTOR.
Harold V. Atwell.
BY
J. H. McCrady
his ATTORNEY.

Patented Nov. 8, 1927.

1,648,670

UNITED STATES PATENT OFFICE.

HAROLD V. ATWELL, OF WHITING, INDIANA.

PROCESS OF EXTRACTING FATS.

Application filed February 27, 1923, Serial No. 621,678. Renewed October 6, 1927.

This invention relates to processes of extracting fats, oils, waxes, and similar substances hereinafter, for convenience, referred to as "fats," from powdered or granular materials in which such substances occur. An important commercial example of such processes is the extraction of cocoa butter from cocoa powder.

The usual process heretofore practiced for extracting fats from materials of the general character above mentioned, consists in mixing the powder with sufficient water to form a paste, next mixing this paste with a solvent for the fat contained in the powder, benzol being the solvent commonly used, then either filtering the mixture or else allowing it to settle and subsequently drawing off or decanting the clear solvent with the fat dissolved therein. Usually it is necessary to extract the paste with several batches of solvent in order to recover the desired percentage of fat contained in the powder.

The preliminary mixing of the powder with water has the very great advantage in a process of this character of facilitating the subsequent separation of the solid and liquid constituents of the solvent mixture. It not only reduces the time required for the settling operation to be performed, but it also results in a more complete separation of the solid constituents from the solvent either by filtration or sedimentation. It is essential in practicing this process, however, that the proper quantity of water be added to the powder to produce a paste. If an insufficient quantity of water is added, a part of the powder will not be wet or moistened, while if too much water is added it interferes with the subsequent settling or filtering operations.

While this process is in general use, it is open to the objection that it consumes an excessive amount of power, since the dry powder and the paste are very difficult to stir; it is very difficult to produce the proper mixture of water and powder, the usual mixing apparatus resulting in the formation of lumps containing substantial percentages of powder that is practically dry; and it must be performed in batches. With these considerations in view, it is the chief object of the present invention to devise a process which will have all the advantages of the prior process above described, and at the same time will avoid the disadvantages just mentioned. In other words, the invention aims to devise a process of the character indicated which can be practiced continuously, will be more economical of power and of apparatus, which will produce more uniform results, and which will result in the recovery of fats of a better quality than those obtained by the processes heretofore available.

The various features of the invention will be readily understood from the following description and will be particularly pointed out in the appended claims. The invention will be described as embodied in a process designed particularly with reference to the requirements of extracting cocoa butter from cocoa powder. It will be understood, however, that the process is equally applicable to the extraction of fats from cotton seed meal, peanut meal, and various other materials, and that the term "powder" as used herein is intended to include these meals and other materials which can be treated by this process.

According to the present process, the dry powder is mixed with a sufficient quantity of water, either hot or cold as circumstances may require, to form a free flowing mixture. For the extraction of cocoa butter satisfactory results may be obtained by mixing the powder with about three times its own weight of water. This forms a fluid composition which can be readily handled by pumps, and can be easily filtered. The mixture so produced is next passed through a continuous filter or through any other convenient form of apparatus adapted to separate the greater part of the water, together with any constituents dissolved therein, from the remaining solid material. Assuming that this separation is effected by filtration, the filter cake left will contain about 50% of water. This moistened or wet material is then mixed with a solvent for the fat which is to be extracted, and the process from this point on may be carried out exactly as in prior processes of the character above described. That is, the moistened powder may be extracted with a suitable solvent any desired number of times until all the fats which can be extracted economically have been removed.

The process above described can be performed either in batches or continuously. It is obvious that the mixing can be performed continuously in known apparatus, as can also the subsequent separation of the surplus water from the solid materials, and the final extraction of the filter cake with suitable solvents. This continuous feature is important from a commercial standpoint since it requires much less apparatus to treat a given quantity of powder in a given time.

The use of a large proportion of water and the subsequent separation of this water from the constituents which are to be extracted with solvents, has the great advantage of removing from the powder constituents having a taste, color, or odor which are objectionable in the fat. For instance, cocoa powder contains a bitter ingredient which is dissolved in the water and is removed in the filtration process. Certain ingredients, also, which would discolor the fat are removed at this time. Such ingredients have not been removed in the prior extraction processes above described, and it has been necessary to treat the fat subsequently to remove them. Since all the solid material is saturated with water it cannot absorb any appreciable amount of solvent or solution, and hence, a cleaner separation is effected in the settling or filtering operations and the recovery of the fat bearing solution is much nearer complete than by any prior process. It will be evident that this factor is of importance since it effects an economy in the extracting process. An economy in power is realized by this process due to the fact that the mixing operation can be performed much more easily when the powder is dispersed in a large quantity of water than when only enough water is used to form a paste.

Since the constituents of objectionable taste, color and odor are removed before the solvent extraction, it is possible to carry on this extraction at high temperatures where the extraction is much more rapid and efficient.

An apparatus suitable for practicing this process is shown diagrammatically in the single figure of the accompanying drawing.

This apparatus comprises a hopper or bin 2 for the powder to be treated, and a screw conveyor 3 which takes this material from the bottom of the hopper and delivers it to a mixer 4. Water is supplied to the mixer through a pipe 5. The mixing of the powder and the water is facilitated by a stirrer 6. An abundance of water is used in performing this mixing operation so that a free flowing mixture is produced, and the mixture flows by gravity through a regulating valve 7 into a continuous rotary filter 8 of a common commercial type. The surplus water is here separated from the fat bearing material, this material being removed from the surface of the filter by a scraper 9 and dropping into another screw conveyor 10. The solvent for the fat is delivered to the conveyor through a pipe 11. The resulting mixture of solvent and solid material is conducted through a pipe 12 to another rotary filter 13, or to any other convenient apparatus for separating the solvent and the fat dissolved therein, from the solid constituents of the mixture.

While the foregoing is illustrative of an apparatus with which the process of this invention may be conveniently practiced, it will be understood that the process can be carried out with the aid of a great variety of forms of apparatus, and that the particular organization of apparatus employed will necessarily depend in some measure upon the conditions encountered in individual installations.

Having thus described my invention, what I desire to claim as new is:

1. That improvement in the process of extracting fats from fat bearing powder which consists in mixing the powder with a sufficient quantity of water to form a free flowing mixture, separating the greater part of the water with any ingredients dissolved therein from the remaining solid material but leaving said material in a moist condition, then treating said moist material with a solvent for the fat contained therein to extract said fat from the material, and performing the foregoing steps continuously.

2. That improvement in the process of extracting fats from cocoa powder which consists in mixing the powder with a sufficient quantity of water to form a free flowing mixture, filtering said mixture to separate the greater part of the water with any ingredients dissolved therein from the remaining material, whereby the residue is left in a moist condition, and then treating said moist material with a solvent for the fat contained therein to extract said fat from the material.

3. That improvement in the process of extracting fats from powdered fat bearing vegetable matter with fat solvents, which consists in mixing the powder with sufficient water to form a free flowing mixture and to dissolve water soluble impurities therein, the water being cool enough to avoid melting the fat, and subsequently filtering the excess of water from this mixture prior to treating the moistened residue to extract the fat therefrom.

4. That improvement in the process of extracting fats from powdered fat bearing vegetable matter with fat solvents, which consists in mixing the powder with sufficient water to form a free flowing mixture and to dissolve water soluble impurities therein and subsequently filtering the excess of water from this mixture prior to treating the moistened residue with a solvent for the fat, and performing the foregoing steps continuously.

HAROLD V. ATWELL.